Nov. 27, 1923. 1,475,789

T. A. BUCKLEY

IMPLEMENT FOR CLEANING TEETH

Filed Oct. 6, 1922

WITNESSES
Edw. Thorpe
P. H. Pattison

INVENTOR
T. Andrew Buckley
BY
ATTORNEYS

Patented Nov. 27, 1923.

1,475,789

UNITED STATES PATENT OFFICE.

THOMAS A. BUCKLEY, OF BROOKLYN, NEW YORK.

IMPLEMENT FOR CLEANING TEETH.

Application filed October 6, 1922. Serial No. 592,805.

*To all whom it may concern:*

Be it known that I, THOMAS A. BUCKLEY, a citizen of the United States, and a resident of the city of New York, borough of Brooklyn, in the county of Kings and State of New York, have invented a new an Improved Implement for Cleaning Teeth, of which the following is a full, clear, and exact description.

The present invention relates to new and useful improvements in instruments or tools for cleaning the teeth, and it pertains more particularly to a tooth brush structure.

It is one of the objects of the invention to so construct a tooth brush handle that the same may be utilized for cleaning the teeth.

It is a further object of the invention to so construct the handle of a tooth brush that a cleaning element, such for example, as gauze, may be secured thereto to aid in cleaning the teeth.

It is a further object of the invention to so construct a tooth brush handle that dental floss may be secured thereto for the purpose of cleaning the spaces between the teeth.

With the above and other objects in view, reference is had to the accompanying drawings, in which—

Figure 1:
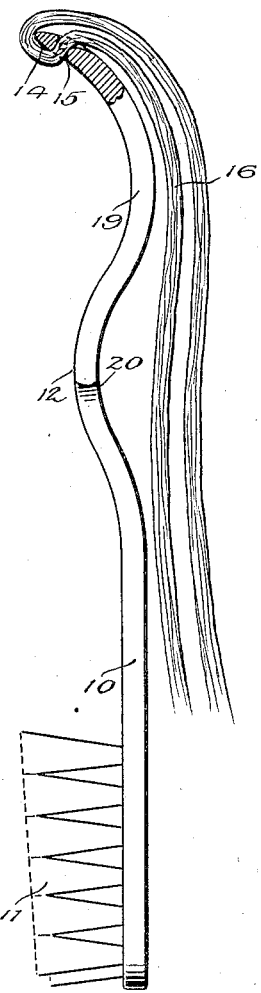
Figure 1 is a view in elevation partly in section, of a tooth brush constructed in accordance with the present invention.
Figure 3:
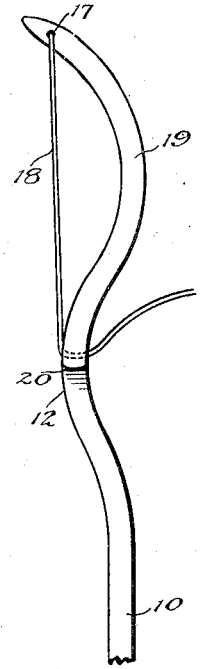
Fig. 3 is a view in side elevation of a portion of the handle of the tooth brush, showing the manner in which the dental floss is secured thereto.
Figure 4:
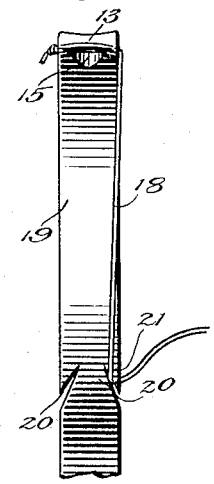
Fig. 4 is a plan view of the handle of the tooth brush, more clearly illustrating the manner of attaching the dental floss thereto.
Figure 2:
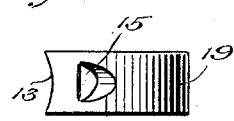
Fig. 2 is a view in end elevation of the handle of the tooth brush.

Referring more particularly to the drawings, the reference character 10 designates the handle of the brush, and 11 designates the brush head thereof. The handle between its ends is bent to form a curved portion 12, and such curved portion provides means for resting the handle against the chin during the operation of scraping the teeth. This curved portion also forms a means for gripping the brush during the scraping operation if it is desired to rest the hand against the chin instead of the brush.

The end of the handle opposite to the brush head 11 is provided with a curved edge 13, and such curved edge is beveled as designated by the reference character 14 to present a clean scraping edge. Adjacent the end, the handle is provided with an opening or passageway 15, and adapted to be threaded therethrough is a strip of gauze or the like, 16. This gauze is threaded from the back of the handle through to the front of the handle and then looped around over the curved bevel edge 13 of the handle in order that the gauze may cover said curved bevel edge, as shown in Fig. 1. Extending edgewise through the handle in a plane at right angles to the opening 15, is a passageway 17, and said passageway 17 is adapted to receive a length of dental floss 18. The handle is again curved, as at 19, to provide means across which the dental floss is adapted to bridge, and in order to secure this dental floss in this bridged position, the handle is provided with notches 20 in which the dental floss 18 is secured, as indicated by the reference character 21.

The device functions in the following manner:

When it is desired to clean or scrape the teeth, the gauze 16 is passed through the opening 15 as shown, and the curved portion 12 of the handle 10 is gripped and a scraping of the teeth may be performed. If desired, the curved portion 12 may be engaged with the chin during the scraping operation.

When it is desired to clean the spaces between the teeth, the floss 18 is positioned as heretofore described and is then passed between the teeth to remove foreign matter therefrom.

The curve 19 of the handle 10 is of such a degree that when the dental floss is being used, the handle will engage the top of the teeth and prevent the dental floss from injuring the gum between the teeth since the curved portion 19 by reason of its engagement with the top of the teeth, determines the distance which the dental floss can extend in the direction of the gum.

From the foregoing it is apparent that the present invention provides a new and improved form of teeth-cleaning implement, and that it further provides such an implement as forming a part of the tooth brush handle without affecting the utility of the tooth brush as such.

What is claimed is:

1. In a toothbrush, a handle, a scraping face formed on the free end of said handle, and a chin rest formed in said handle intermediate of its ends, said chin rest being formed by bending said handle into a compound curve.

2. In a tooth brush, a handle having a curved portion intermediate of its ends, said curved portion constituting a chin-engaging member, one end of said tooth brush handle being curved adjacent the first-mentioned curved portion and in a direction opposite thereto, and a scraping face formed on the curved end of said handle.

3. In a tooth brush, a handle, said handle being formed with a compound curve, an opening in the end of the tooth brush handle adapted to receive one end of a length of dental floss, and a notch formed in the compound curved portion of the handle and adapted to receive the other end of the dental floss to maintain the dental floss in bridged relation to one of the curves of said compound curved portion.

4. A toothbrush having a handle, the end of which is formed with a scraping face and an opening provided in the handle to the rear of said scraping face whereby a cleaning element may be inserted through the opening and overlapped about the scraping face on the end of the handle, as and for the purpose set forth.

THOMAS A. BUCKLEY.